(12) United States Patent
Badam et al.

(10) Patent No.: US 8,909,929 B2
(45) Date of Patent: Dec. 9, 2014

(54) STORED PUBLIC KEY VALIDITY REGISTERS FOR CRYPTOGRAPHIC DEVICES AND SYSTEMS

(75) Inventors: Balaji Badam, Colorado Springs, CO (US); Kerry Maletsky, Monument, CO (US); David Durant, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 188 days.

(21) Appl. No.: 13/485,678

(22) Filed: May 31, 2012

(65) Prior Publication Data

US 2013/0326219 A1 Dec. 5, 2013

(51) Int. Cl.
H04L 9/32 (2006.01)
H04K 1/00 (2006.01)
H04L 9/30 (2006.01)

(52) U.S. Cl.
USPC ............................................ 713/168; 380/30

(58) Field of Classification Search
USPC ......................................................... 713/168
See application file for complete search history.

(56) References Cited

U.S. PATENT DOCUMENTS

| | | | |
|---|---|---|---|
| 6,463,495 B1 * | 10/2002 | Angelo et al. .............. 710/305 |
| 7,225,341 B2 * | 5/2007 | Yoshino et al. ............. 713/193 |
| 7,246,370 B2 * | 7/2007 | Valente et al. .................... 726/1 |
| 7,269,409 B2 * | 9/2007 | Suzuki et al. ................ 455/411 |
| 7,343,159 B2 * | 3/2008 | Saito et al. ................ 455/435.1 |
| 7,478,422 B2 * | 1/2009 | Valente et al. .................... 726/4 |
| 7,607,164 B2 * | 10/2009 | Vasishth et al. ................... 726/1 |
| 7,743,248 B2 * | 6/2010 | Bisbee et al. ................. 713/158 |
| 7,783,895 B2 * | 8/2010 | Hori et al. ..................... 713/189 |
| 7,835,725 B2 * | 11/2010 | Suzuki et al. ................ 455/411 |
| 7,929,409 B2 * | 4/2011 | Chitrapu et al. ............. 370/208 |
| 8,019,996 B2 * | 9/2011 | Hashimoto et al. .......... 713/169 |
| 8,074,256 B2 * | 12/2011 | Valente et al. .................... 726/1 |
| 8,176,325 B2 * | 5/2012 | Lai et al. ...................... 713/171 |
| 8,316,233 B2 * | 11/2012 | Errico ........................... 713/165 |
| 8,320,912 B2 * | 11/2012 | Saito et al. ................. 455/435.1 |
| 8,442,229 B2 * | 5/2013 | Effenberger .................. 380/256 |
| 8,468,364 B2 * | 6/2013 | Goto ............................. 713/187 |
| 8,494,157 B2 * | 7/2013 | Takashima et al. ........... 380/201 |
| 8,549,087 B2 * | 10/2013 | Leonard ........................ 709/206 |
| 8,644,515 B2 * | 2/2014 | Ho ................................. 380/278 |
| 8,788,840 B2 * | 7/2014 | Goto ............................. 713/187 |
| 2003/0149854 A1 * | 8/2003 | Yoshino et al. ............... 711/173 |
| 2003/0188117 A1 * | 10/2003 | Yoshino et al. ............... 711/164 |
| 2004/0101142 A1 * | 5/2004 | Nasypny ....................... 380/278 |
| 2004/0249993 A1 * | 12/2004 | Hori et al. ....................... 710/20 |
| 2004/0253943 A1 * | 12/2004 | Suzuki et al. ................ 455/411 |
| 2005/0003814 A1 * | 1/2005 | Saito et al. ................. 455/435.1 |
| 2005/0195975 A1 * | 9/2005 | Kawakita ........................ 380/30 |
| 2006/0271788 A1 * | 11/2006 | Chang et al. ................. 713/182 |
| 2007/0198831 A1 * | 8/2007 | Suzuki et al. ................ 713/156 |
| 2007/0198851 A1 * | 8/2007 | Goto ............................. 713/187 |

(Continued)

*Primary Examiner* — Carolyn B Kosowski
(74) *Attorney, Agent, or Firm* — Fish & Richardson P.C.

(57) ABSTRACT

Systems and techniques for performing cryptographic operations based on public key validity registers are described. A described system includes a controller and a memory structure to store one or more public keys. The memory structure includes one or more validity registers that respectively correspond to the one or more public keys. The controller has exclusive write access to the validity register. The controller can be configured to perform an authentication of a public key, write an authentication status value to the corresponding validity register based on a result of the authentication, and perform one or more cryptographic operations using the public key that are conditional on the validity register indicating an authenticated status for the public key.

20 Claims, 6 Drawing Sheets

(56) References Cited

U.S. PATENT DOCUMENTS

| | | | |
|---|---|---|---|
| 2007/0199049 A1* | 8/2007 | Ziebell | 726/3 |
| 2008/0063200 A1* | 3/2008 | Takashima et al. | 380/201 |
| 2008/0098221 A1* | 4/2008 | Hashimoto et al. | 713/169 |
| 2008/0119185 A1* | 5/2008 | Saito et al. | 455/435.1 |
| 2008/0244267 A1* | 10/2008 | Zimmer et al. | 713/171 |
| 2010/0121928 A1* | 5/2010 | Leonard | 709/206 |
| 2010/0217985 A1* | 8/2010 | Fahrny et al. | 713/169 |
| 2010/0257576 A1* | 10/2010 | Valente et al. | 726/1 |
| 2011/0029773 A1* | 2/2011 | Effenberger | 713/168 |
| 2011/0074552 A1* | 3/2011 | Norair et al. | 340/10.1 |
| 2012/0039474 A1* | 2/2012 | Ho | 380/278 |
| 2012/0102325 A1* | 4/2012 | Devanand et al. | 713/168 |
| 2012/0128155 A1* | 5/2012 | Effenberger | 380/256 |
| 2012/0143967 A1* | 6/2012 | Leonard | 709/206 |
| 2012/0290868 A1* | 11/2012 | Gladwin et al. | 714/4.1 |
| 2012/0290877 A1* | 11/2012 | Grube et al. | 714/15 |
| 2012/0290878 A1* | 11/2012 | Gladwin et al. | 714/20 |
| 2013/0064123 A1* | 3/2013 | Saito et al. | 370/252 |
| 2013/0117554 A1* | 5/2013 | Ylonen | 713/151 |
| 2013/0198526 A1* | 8/2013 | Goto | 713/189 |
| 2013/0291078 A1* | 10/2013 | McFarland et al. | 726/6 |
| 2013/0326219 A1* | 12/2013 | Badam et al. | 713/168 |
| 2014/0052991 A1* | 2/2014 | Effenberger | 713/171 |

* cited by examiner

STORED PUBLIC KEY VALIDITY REGISTERS FOR CRYPTOGRAPHIC DEVICES AND SYSTEMS

TECHNICAL FIELD

This patent document relates generally to cryptographic device and associated operations.

BACKGROUND

Computer systems use cryptographic techniques for activities such as secure communications, message authentication, digital signatures, and payment processing. Other activities are possible. Some cryptographic systems can use techniques based on Diffie-Hellman, RSA, or Elliptic Curve Cryptography (ECC) for public key cryptography. For example, Elliptic Curve Digital Signature Algorithm (ECDSA) requires the use of one or more public keys that are based on ECC. A public key can be associated with an entity such as a service, person, business, or device. The public key has a corresponding private key, which is kept secret by the entity.

A recipient of information containing a public key that purports to belong to a specific entity (e.g., a financial institution) may authenticate the public key with that entity. In some public key authentication protocols, a recipient of a public key can authenticate the public key by sending a challenge that is created using the public key to the entity associated with the public key. The entity answers the challenge by performing a cryptographic operation using the corresponding private key, and sends a challenge result back to the recipient. The recipient then checks the challenge result to produce an authentication status for the public key. Other types of public key authentication techniques are possible. In some cases, authentication can be referred to as verification.

SUMMARY

This document describes, among other things, technologies relating to cryptographic devices, systems, and operations. In one aspect, a described device includes a controller and a memory structure to store one or more public keys. The memory structure can include one or more validity registers that respectively correspond to the one or more public keys. The controller has exclusive write access to the validity register. The controller can be configured to perform an authentication of a public key, write an authentication status value to the corresponding validity register based on a result of the authentication, and perform one or more cryptographic operations using the public key that are conditional on the validity register indicating an authenticated status for the public key.

This and other implementations can include one or more of the following features. Implementations can include a host interface to communicate with a host. The controller can be configured to receive a command from the host via the host interface, the command indicating a cryptographic operation to be performed using the public key. In some implementations, the controller is configured to send a failure code to the host in response to the command if the validity register indicates an unauthenticated status for the public key. In some implementations, the controller is configured to grant the host read-only access to the validity register. In some implementations, a validity register includes two or more bits, and an authentication status value can be written to each of the two or more bits. The controller can configured to read the two or more bits from the validity register to determine an authentication status for a public key. In some implementations, a validity register includes three or more bits. The authentication status value can be written to each of the three or more bits. The controller can be configured to read the three or more bits from the validity register to determine an authentication status for the public key based on a majority agreement of the three or more bits. The controller can be configured to write an unauthenticated status value to the validity register in response to changing the public key. A device can include an integrated circuit that includes the memory structure and the controller. In some implementations, the memory structure contains a non-volatile memory. The memory structure can store multiple public keys and corresponding validity registers in the non-volatile memory.

A described technique includes retrieving a public key stored in a memory structure, performing an authentication of the public key to determine an authentication status value, writing the authentication status value to a validity register of the memory structure that corresponds to the public key, and performing one or more cryptographic operations using the public key that are conditional on the validity register indicating an authenticated status for the public key. The technique can include receiving a command from a host, the command indicating a cryptographic operation to be performed using the public key. The technique can include writing an unauthenticated status value to the validity register in response to changing the public key. Performing one or more cryptographic operations can include sending a failure code to the host in response to the command if the validity register indicates an unauthenticated status for the public key. The validity register can include two or more bits. Writing the authentication status value can include writing the authentication status value to each of the two or more bits. Performing one or more cryptographic operations can include reading the two or more bits from the validity register to determine an authentication status for the public key.

A described system includes a host and a cryptographic device. The cryptographic device can include a host interface to communicate with the host and a memory structure to store a public key and a validity register that corresponds to the public key. The cryptographic device has exclusive write access to the validity register. The cryptographic device can be configured to perform an authentication of the public key, write an authentication status value to the validity register based on a result of the authentication, receive a command from the host via the host interface, the command indicating a cryptographic operation to be performed by the cryptographic device using the public key, perform the cryptographic operation based on checking the validity register to determine an authentication status for the public key, and send a failure code to the host in response to the command based on the validity register indicating an unauthenticated status for the public key. The host can be configured to load the public key in to the cryptographic device. The cryptographic device can be configured to write an unauthenticated status value to the validity register in response to the public key being loaded.

Particular embodiments of the technology described in this document can be implemented so as to realize one or more of the following advantages. One or more described technologies can reduce the computational complexity of a cryptographic device, reduce the latency in handling a cryptographic operation that requires an authenticated public key, or both. Performing a public key authentication technique and storing its results in a secure manner can alleviate having to perform the authentication technique for each cryptographic operation that requires its associated public key to be authenticated. The public key authentication technique can be bypassed when a public key's corresponding validity register indicates an authenticated status.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Cryptographic systems such as those that include cryptographic devices for asymmetric authentication may depend on an ability of a verifier to ascertain that the public key of the device to be verified is authentic. High performance computers such as a laptop or a desktop computer can, in some cases, re-verify an entire signature chain with every transaction because they may not have an ability to securely store the verification status and its association with a particular public key. In contrast, some secure key storage devices may have less computational power and, consequently, a requirement to re-verify the entire signature chain on every authentication procedure would make them unsuitable for many uses since the response time would be slower.

This document describes technologies that, among other things, cause a signature chain to be verified and store the status of that verification stored in nonvolatile memory for use later, e.g., a public key authentication status is retained in a secure manner for later. A described device includes a validity register associated with a stored public key to indicate that the key has been validated by a trusted entity. The validity register can include one or more bits. Having the validity register and the key stored in a secure persistent memory may increase computational efficiency by eliminating validation of one or more portions of the certificate chain in future cryptographic operations. A described technology can be used to validate a public key at some initial location or time where the effect of that validation can then be used at a different location or time.

Retaining a public key authentication status in a secure manner can include storing the status in a cryptographic device such that an external source cannot directly alter the status. For example, the ability to set the validity register to an authenticated status can be tied directly to a cryptographic authentication process executed by the cryptographic device. Moreover, the location of the validity register within a memory structure and the ability to change the register can be protected by the device such that the ability for an unauthorized entity to change the validity register is constrained or eliminated.

Figure 1:
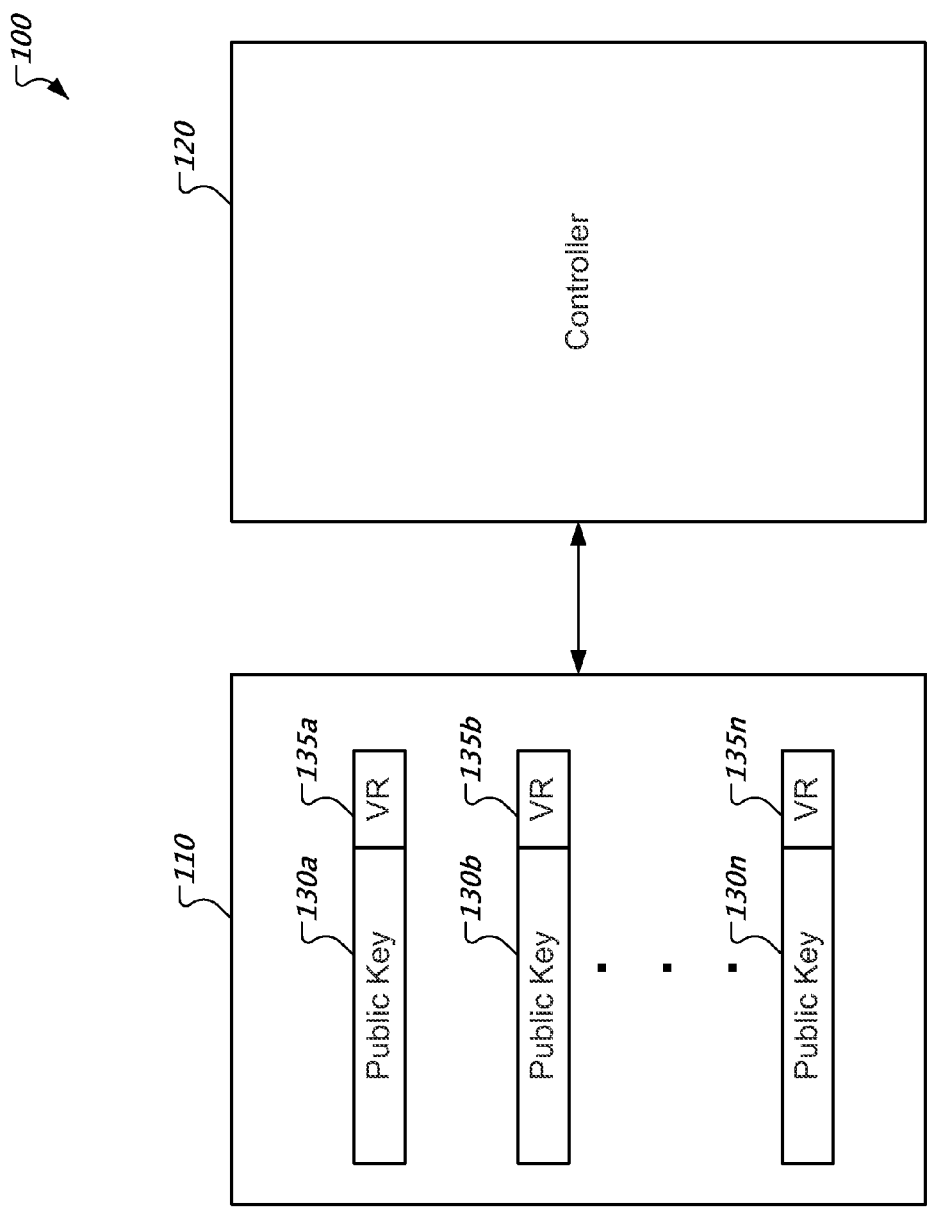
FIG. 1 shows a schematic diagram of an example architecture of a cryptographic device that includes validity registers for public keys.

FIG. 1 shows a schematic diagram of an example architecture of a cryptographic device 100 that includes validity registers (VRs) 135$a$-$n$ for public keys 130$a$-$n$. The cryptographic device 100 includes a memory structure 110 and a controller 120. The memory structure 110 stores one or more public keys 130$a$-$n$. In addition, the memory structure 110 stores authentication statuses within validity registers 135$a$-$n$ that correspond respectively to the public keys 130$a$-$n$. In some implementations, an authentication status is either an authenticated status or an unauthenticated status. The validity registers 135$a$-$n$ can be initialized to indicate an unauthenticated status. Such an initialization can occur during the manufacturing of the cryptographic device 100, when the controller 120 loads a public key into the memory structure 110, or both. In some implementations, the manufacturing of the cryptographic device 100 includes programming one or more public keys into the memory structure 110. In some implementations, the cryptographic device 100 receives one or more public keys from a connected host. A public key 130$a$-$n$ can be generated based on a asymmetric cryptographic process such as one based on ECC, DH, or RSA. Once manufactured, the controller 120 has exclusive write access to the validity registers 135$a$-$n$. While an external source such as a host can cause the controller 120 to write an authentication status to the validity register 135$a$-$n$, the authentication status is determined by and written exclusive by the controller 120. In some implementations, a controller 120 includes a first controller to write to a validity register and a second controller to check a validity register.

The controller 120 can be configured to perform an authentication of one or more public keys 130$a$-$n$. In some implementations, an authentication process can be referred to as a verification process. Based on a result of the authentication, the controller 120 can write a value to the corresponding validity register 135$a$-$n$. The controller 120 can perform a cryptographic operation(s) that is conditional on a validity register 135$a$-$n$ indicating an authenticated status for a public key 130$a$-$n$ required by the cryptographic operation(s). For example, the cryptographic operation can be aborted based on a public key 130$a$-$n$ having an unauthenticated status in its corresponding validity register 135$a$-$n$. An unauthenticated status can mean that a corresponding public key has not yet been authenticated or has failed an authentication process.

In some implementations, a validity register 135$a$-$n$ is represented by one or more bits stored in the memory structure 110. The memory structure 110 can include non-volatile memory such as an Electrically Erasable Programmable Read-Only Memory (EEPROM) or flash memory. In some implementations, the memory structure 110 can include battery backed random access memory (RAM) such as static random-access memory (SRAM) or magneto-resistive random-access memory (MRAM). In some implementations, the memory structure 110 can include two or more structures. Moreover, the memory structure 110 can include a random access memory (RAM) for temporary data storage. In some implementations, the memory structure 110 and the controller 120 are formed on an integrated circuit. In some implementations, the controller 120 includes one or more processors. In some implementations, the controller 120 includes specialized logic to perform one or more operations.

Figure 2:
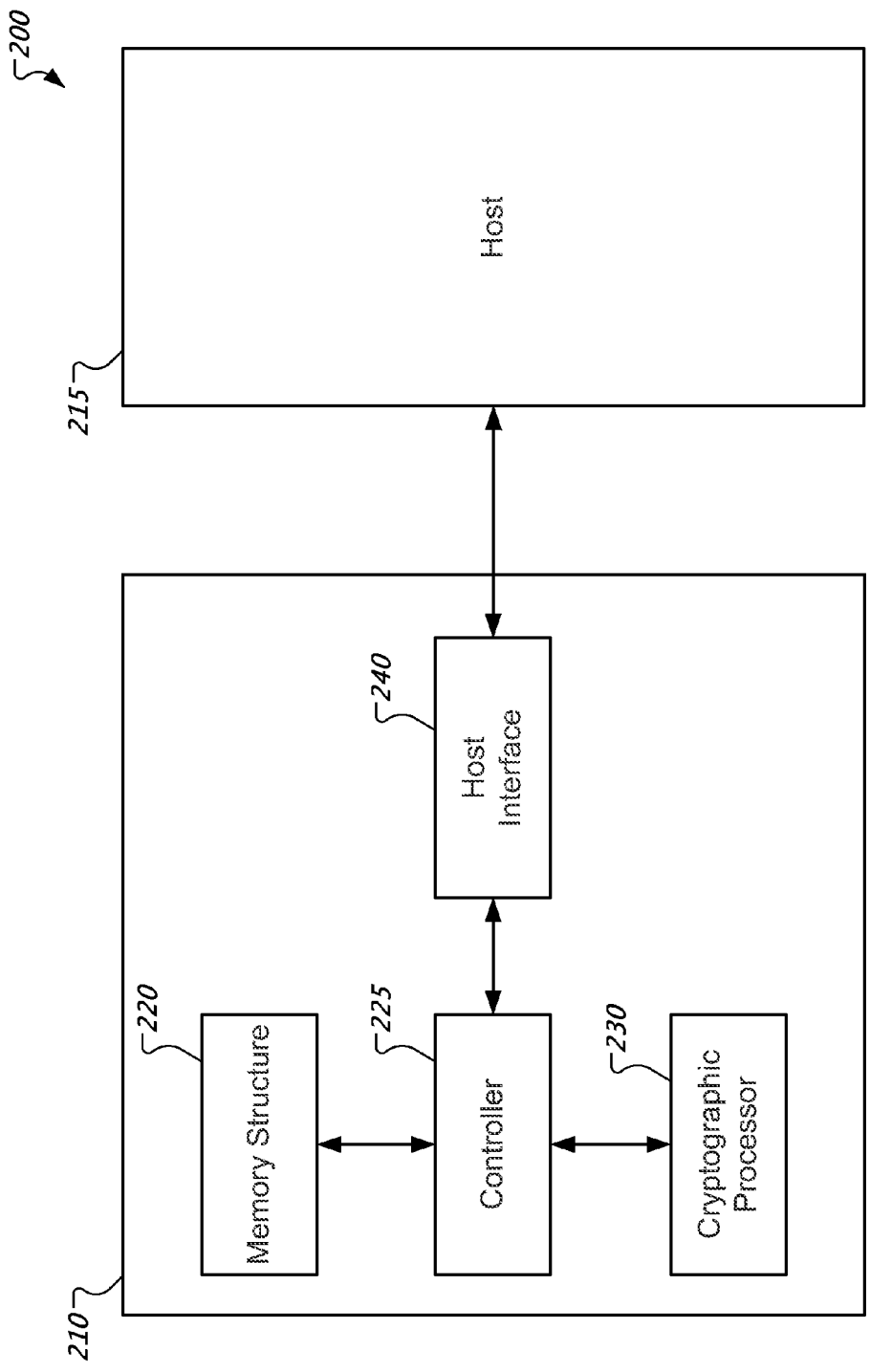
FIG. 2 shows a schematic diagram of an example architecture of a system that includes a cryptographic device.

FIG. 2 shows a schematic diagram of an example architecture of a system 200 that includes a cryptographic device 210. The cryptographic device 210 includes a memory structure 220, controller 225, cryptographic processor 230, and a host interface 240. The cryptographic device 210 can communicate with a host 215 via a host interface 240. The host 215 can use the cryptographic device 210 for one or more purposes such as anti-cloning for accessories, daughter cards, and consumables, secure boot validation, network and computer access control, password handling, and authenticated and encrypted network communications. In some implementations, the host interface 240 includes a serial interface. In some implementations, the host interface 240 includes a parallel interface.

The controller 225 can be configured to receive a command from the host 215 via the host interface 240. The command can indicate a cryptographic operation to be performed by the cryptographic device 210. In some implementations, the command is represented by a sequence of bits signaled via a communication bus. The sequence can represent an operation code and, if required by the command's semantics, one or more parameters such as a public key, message data, public key index value, or a nonce value. The controller 225 can cause a cryptographic processor 230 to perform a cryptographic operation after the controller 225 determines an authentication status of a public key required by the cryptographic operation. In some implementations, the controller 225 includes the cryptographic processor 230. In some implementations, the controller 225 is configured to grant the host 215 read-only access to one or more validity registers stored within the memory structure 220.

Figure 3:
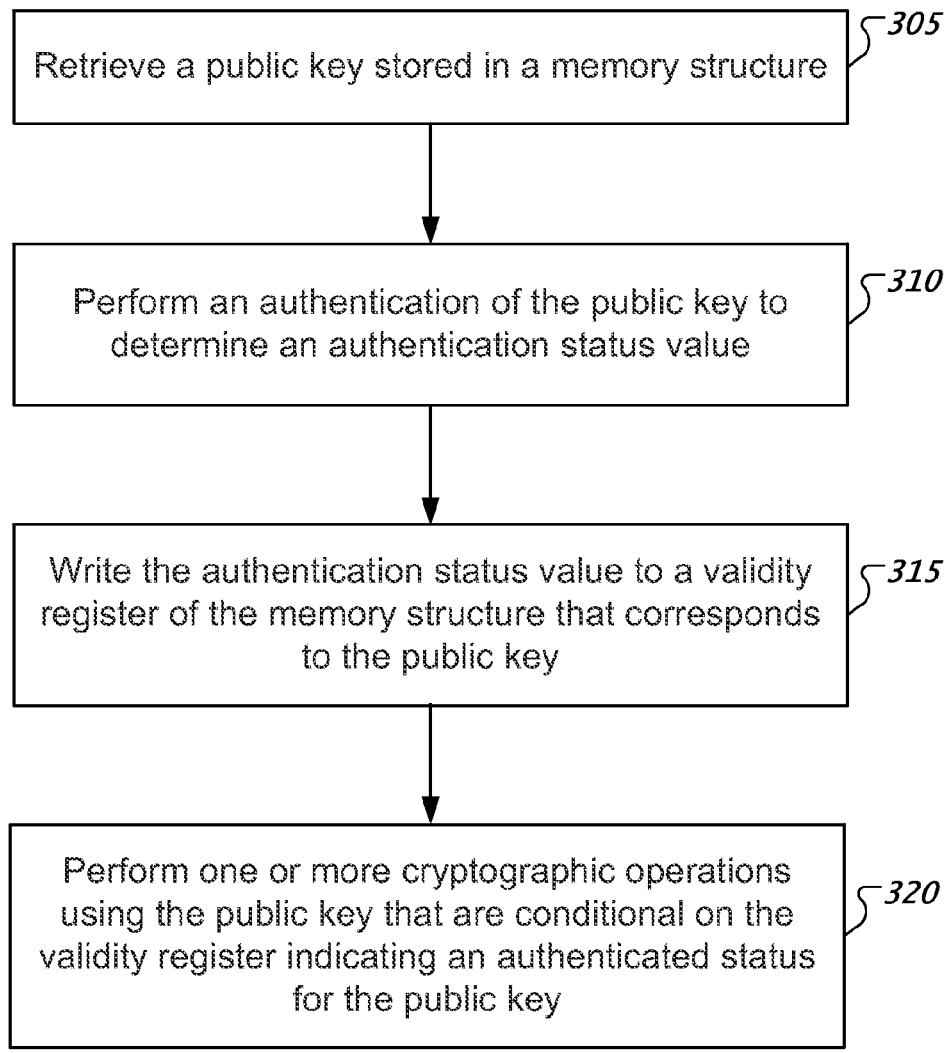
FIG. 3 shows a flowchart of an example process that includes performing a public key authentication technique and storing a result in a validity register.

FIG. 3 shows a flowchart of an example process that includes performing a public key authentication technique and storing a result in a validity register. The public key authentication technique can be triggered based on a command from a host, loading of a public key, or a discovery of an unauthenticated public key. Other triggers are possible. At 305, the process retrieves a public key stored in a memory structure. The size of the public key can be implementation specific. Various sizes for a public key are possible. At 310, the process performs an authentication of the public key to determine an authentication status value. Authenticating the public key can include communicating with an entity that is associated with the public key. In some implementations, the entity has to prove that it can access the corresponding private key by answering a challenge. Authenticating the public key can include exchanging one or more messages with the entity. Upon successfully answering the challenge, the process can generate an authentication status value that corresponds to an authenticated status. Otherwise, on failing the challenge, the process can generate an authentication status value that corresponds to an unauthenticated status. Other public key authentication techniques are possible. For example, a successful signature verification based on an ECDSA routine can generate an authenticated status for a corresponding public key. At 315, the process writes the authentication status value to a validity register of the memory structure that corresponds to the public key. Writing the authentication status value can including programming one or more bits within the memory structure at one or more bit locations that correspond with a specific public key. At 320, the process performs one or more cryptographic operations using the public key that are conditional on the validity register indicating an authenticated status for the public key. Performing a cryptographic operation can include reading a validity register that corresponds to a public key required by the cryptographic operation to be authenticated.

Figure 4:
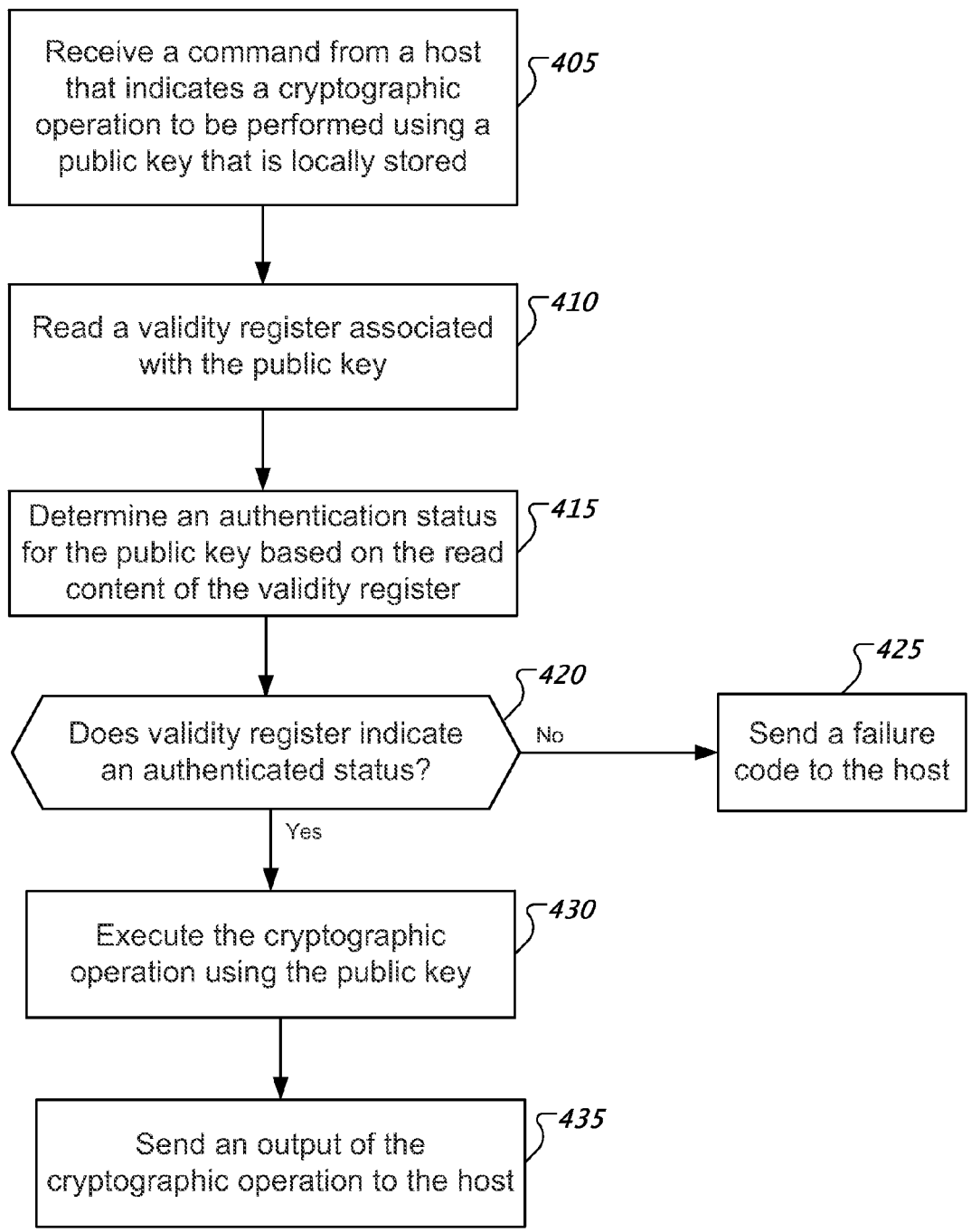
FIG. 4 shows a flowchart of an example process that includes performing a cryptographic operation.

FIG. 4 shows a flowchart of an example process that includes performing a cryptographic operation. At 405, the process receives a command from a host that indicates a cryptographic operation to be performed using a public key that is locally stored. In some implementations, a command can indicate a cryptographic operation to be performed using a shared key derived from a public key and a private key. Various examples of cryptographic operations include message signing, encryption, decryption, and message authentication. Other types of cryptographic operations are possible. At 410, the process reads a validity register associated with the public key. Reading a validity register can include sending a read request a memory structure that identifies a memory address to be read. At 415, the process determines an authentication status for the public key based on the read content of the validity register. Determining an authentication status can include comparing a value read from the validity register with a known value that corresponds with an authentication status. If, at 420, the process determines that the validity register does not indicate an authenticated status, then, at 425, the process sends a failure code to the host. The failure code can indicate that the public key is unauthenticated. If, at 420, the process determines that the validity register does indicate an authenticated status, then, at 430, the process executes the cryptographic operation using the public key. Executing the cryptographic operation can include retrieving the public key from a memory structure. At 435, the process sends an output of the cryptographic operation to the host. Such an output may include a message authentication code for a message, a decrypted version of a message, or an encrypted version of a message. Other types of outputs are possible.

Figure 5:
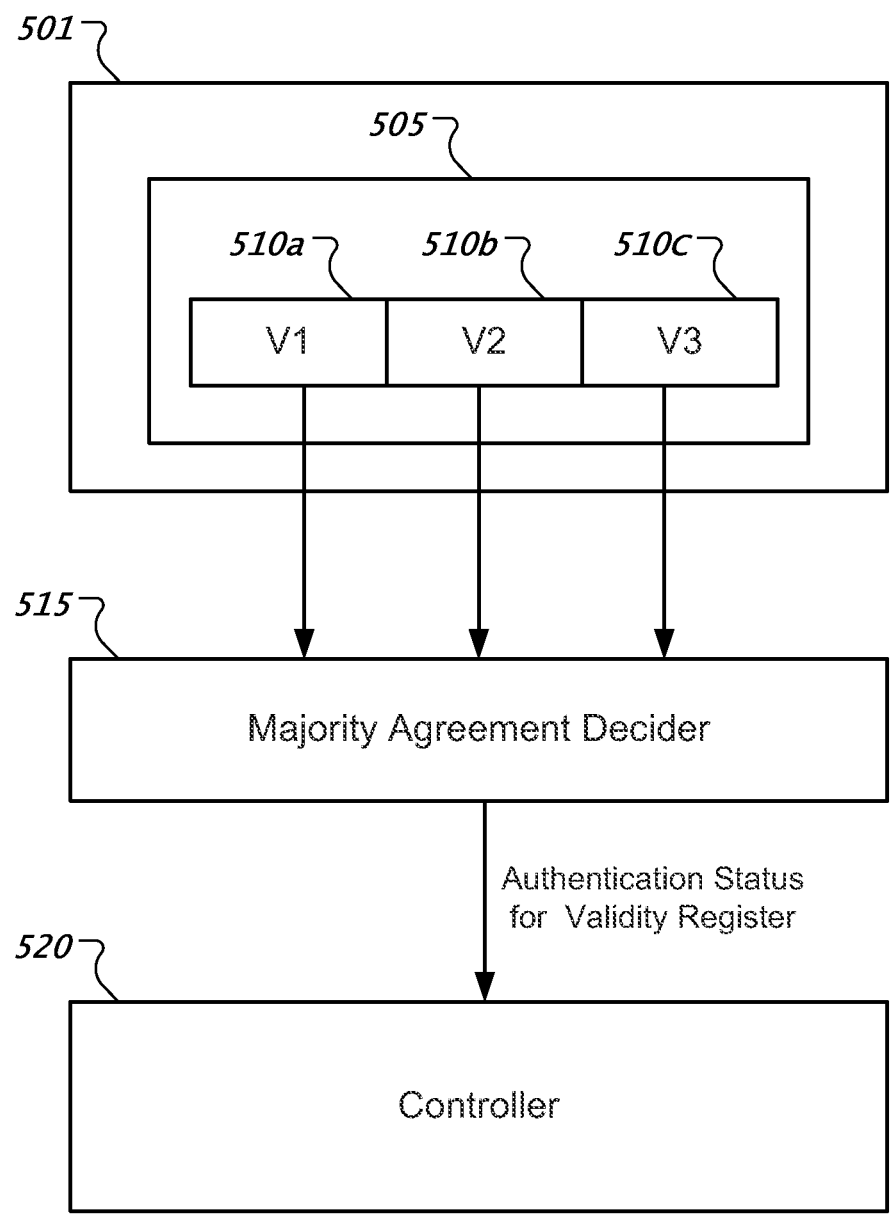
FIG. 5 shows a schematic diagram of an example architecture that includes a validity register containing multiple bits for redundancy.

FIG. 5 shows a schematic diagram of an example architecture that includes a validity register 505 containing multiple bits 510a-c for redundancy. In this example, the validity register 505 includes three bits 510a-c (V1, V2, and V3) for redundancy proposes. Other numbers of bits are possible for a validity register. The validity register 505 can be represented by bits stored in a memory structure 501. After performing an authentication of a public key to determine an authentication status value, the controller 520 can write the same authentication status value to each of the bits 510a-c of the validity register 505.

Reading the validity register 505 can include causing a majority agreement decider 515 to read the bits 510a-c from the validity register 505. The majority agreement decider 515 can determine an authentication status for the validity register 505 based on a majority agreement of the bits 510a-c and send the authentication status to the controller 520. For example, if two or more of the bits 510a-c indicate an authenticated status, then the decider 515 outputs an authenticated status. If two or more of the bits 510a-c indicate an unauthenticated status, then the decider 515 outputs an unauthenticated status. In some implementations, a memory structure 501 includes a majority agreement decider 515. In some other implementations, the controller 520 includes a majority agreement decider 515. A majority agreement decider 515 can include one or more logic gates configured to perform a majority vote function based on the values of the bits 510a-c.

In some implementations, a validity register has two or more bits and the majority agreement decider 515 can be replaced with an absolute decider. The absolute decider can determine whether any bits of the validity register are set to an unauthenticated status. If at least one bit is set to an unauthenticated status and regardless of the other bits, the absolute decider outputs an unauthenticated status for the entire validity register.

Figure 6:
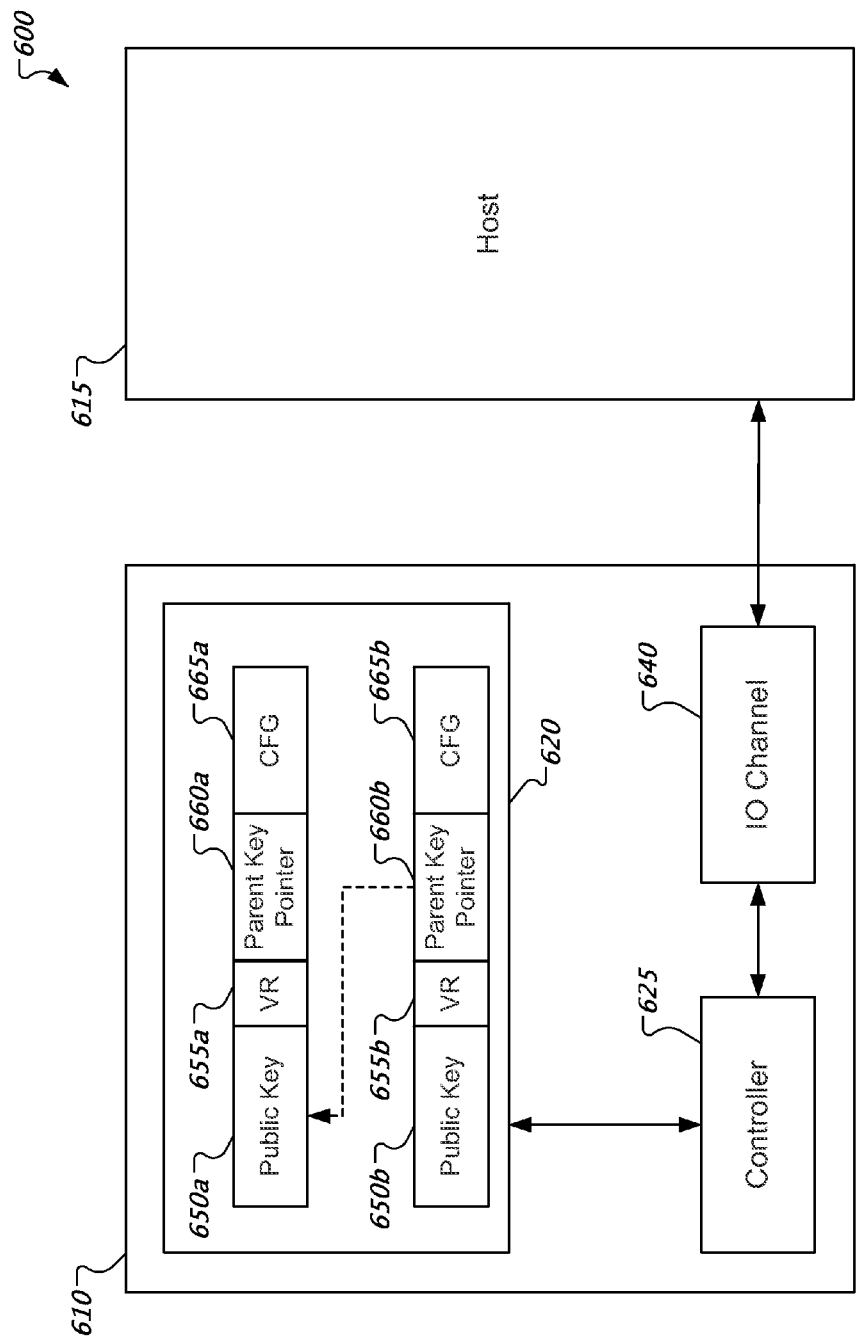
FIG. 6 shows a schematic diagram of another example architecture of a system that includes a cryptographic device.

FIG. 6 shows a schematic diagram of another example architecture of a system 600 that includes a cryptographic device 610. The system 600 includes a cryptographic device 610 and a host 615. The cryptographic device 610 can store public and private keys such as ECC keys in a memory structure 620. The device 610 can include a host interface such as an IO channel 640 to receive a command from a host 615 or to send a command to the host 615. A command can include a group of bytes which can be transmitted to the cryptographic device via a host interface. A command can indicate an operation that to be performed and can include one or more inputs for the execution of that command.

The memory structure 620 can include a non-volatile memory configured to have one or more key slots 650*a-b* of a predetermined length, one or more validity registers 655*a-b*, one or more parent key pointers 660*a-b*, and one or more key configuration slots 665*a-b*. A key configuration slot 665*a-b* can include an access permission list to allow or deny access or use of one or more public keys stored in one or more key slots 650*a-b* of the memory structure 620. A key configuration slot 665*a-b* can include a value that indicates that the public key stored in a corresponding slot 650*a-b* has to be authenticated prior to use. In some implementations, a parent key pointer 660*a-b* is a multi-bit pointer to a parent public key that should be used to validate the public key in a corresponding slot 650*a-b*. If a public key is reloaded or regenerated in a key slot, a corresponding validity register 655*a-b* can be reset to an unauthenticated status. One or more bits within a key configuration slot 665*a-b* can be used to indicate a policy of whether a random nonce is required for an authentication of a public key. The cryptographic device 610 has exclusive write access to the validity registers 655*a-b* such that any external entity such as the host 615 cannot write to the validity registers 655*a-b*.

The host 615 can cause the cryptographic device 610 to perform a public key authentication process on a public key stored in a public key slot 650*b*. The public key slot 650*b* can be loaded with a public key during a manufacturing process, loaded via a command from the host 615, or both. The corresponding parent key pointer 660*b* points to a slot 650*a* containing the parent public key. In some implementations, the parent public key slot 650*a* has a corresponding validity register 655*a* that is permanently set to an authenticated status and a parent key pointer 660*a* set to NULL. In some implementations, the parent public key slot 650*a* can be authenticated and have a parent key pointer 660*a* that pointers to another parent key pointer.

In a public key authentication process, the host 615 can store a nonce in the cryptographic device 610 using a nonce command. In some implementations, the nonce command causes the cryptographic device 610 to generate a nonce using a random number generator. The host 615 or another entity can generate a signature of the nonce and public key based on the parent public key stored in the cryptographic device 610 at the parent public key slot 650*a*. The cryptographic device 610 can use a hash function such as SHA-256 to generate a hash of the nonce and the public key to be authenticated in response to a command received from the host 615. A verify command, received from the host 615, can cause the cryptographic device 610 to generate a digest of information including the output of the hash function and, if present in the verify command, one or more additional parameters. The cryptographic device 610 obtains the parent public key in the slot 650*a* pointed to by the parent key pointer slot 660*b* for the public key being authenticated. The public key authentication process can use an ECC signature verification algorithm to produce an authentication result based on the digest of information and the parent public key. If the ECC signature verification algorithm indicates an authenticated public key, the validity register 655*b* for the authenticated public key is set to indicate an authenticated status, otherwise the validity register 655*b* is set to have an unauthenticated status.

A cryptographic device, in some implementations, can clear a validity register if an attempted authentication check fails. Clearing a validity register can include setting one or more bits to indicate an unauthenticated status. In some implementations, a global reset command or a signal received via a global reset pin can clear all of the validity registers within a cryptographic device. In some implementations, a validity register can be cleared by a detection of a tampering event. In some implementations, a validity register can be cleared when the power is removed.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The operations described in this document can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an field programmable gate array (FPGA) or an application-specific integrated circuit (ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry such as a FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, tablet, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
a memory structure to store a public key, wherein the memory structure comprises a validity register that corresponds to the public key; and
a controller configured to perform an authentication of the public key, write an authentication status value to the validity register based on a result of the authentication, the authentication status value corresponding to one of an authenticated status for the public key or an unauthenticated status for the public key, and perform one or more cryptographic operations using the public key that are conditional on the validity register indicating the authenticated status for the public key, wherein the apparatus has exclusive write access to the validity register,
wherein the validity register comprises two or more bits, and the controller is configured to write the authentication status value to each of the two or more bits, and
wherein the controller is configured to read the two or more bits from the validity register to determine an authentication status for the public key based on at least one of whether a majority agreement of the two or more bits indicates the authenticated status for the public key or whether any bit of the two or more bits indicates the unauthenticated status for the public key.

2. The apparatus of claim 1, further comprising:
a host interface to communicate with a host, wherein the controller is configured to receive a command from the host via the host interface, the command indicating a cryptographic operation to be performed by the apparatus using the public key.

3. The apparatus of claim 2, wherein the controller is configured to send a failure code to the host in response to the command if the validity register indicates the unauthenticated status for the public key.

4. The apparatus of claim 1, further comprising:
a host interface to communicate with a host, wherein the controller is configured to grant the host read-only access to the validity register.

5. The apparatus of claim 1, wherein the controller is configured to write an unauthenticated status value to the validity register in response to changing the public key.

6. The apparatus of claim 1, further comprising:
an integrated circuit that comprises the memory structure and the controller.

7. The apparatus of claim 1, wherein the memory structure contains a non-volatile memory, wherein the memory structure stores a plurality of public keys and corresponding validity registers in the non-volatile memory.

8. The apparatus of claim 1, wherein the memory structure stores a first public key associated with a first validity register and a first parent key pointer and a second public key associated with a second validity register and a second parent key pointer,
wherein the second parent key pointer of the second public key is a multi-bit pointer to the first public key, and
wherein the controller is configured to write an unauthenticated status value to the second validity register in response to updating the first public key, the unauthenticated status value corresponding to an unauthenticated status for the second key.

9. The apparatus of claim 8, wherein the memory structure is configured to store a first key configuration slot for the first public key, the first key configuration slot including at least one of an access permission list to allow or deny access or use of the first public key, a value indicating that the first public key has to be authenticated prior to use, or one or more bits indicating a policy of whether a random nonce is required for an authentication of the first public key.

10. The apparatus of claim 8, wherein the controller is configured to:
generate a nonce in response to receiving a nonce command from a host via a host interface in the controller;
generate, by using a hash function, a hash of the nonce and the second public key in response to receiving a command to authenticate the second public key from the host, the second public key being generated based on the first public key;
produce, by using a verification algorithm, an authentication result based on the hash and the first public key; and
write a second authentication status value for the second public key to the second validity register based on the authentication result.

11. A method comprising:
retrieving a public key stored in a memory structure;
performing an authentication of the public key to determine an authentication status value, the authentication status value corresponding to one of an authenticated status for the public key or an unauthenticated status for the public key;
writing the authentication status value to a validity register of the memory structure that corresponds to the public key; and
performing one or more cryptographic operations using the public key that are conditional on the validity register indicating an authenticated status for the public key,
wherein the validity register comprises two or more bits, wherein writing the authentication status value comprises writing the authentication status value to each of the two or more bits, and
wherein performing one or more cryptographic operations comprises reading the two or more bits from the validity register to determine the authentication status for the public key based on at least one of whether a majority agreement of the two or more bits indicates the authenticated status for the public key or whether any bit of the two or more bits indicates the unauthenticated status for the public key.

12. The method of claim 11, further comprising:
receiving a command from a host, the command indicating a cryptographic operation to be performed using the public key.

13. The method of claim 12, wherein performing one or more cryptographic operations comprises sending a failure code to the host in response to the command if the validity register indicates the unauthenticated status for the public key.

14. The method of claim 11, further comprising:
writing an unauthenticated status value to the validity register in response to changing the public key.

15. The method of claim 11, further comprising:
generating a nonce in response to receiving a nonce command from a host via a host interface;
generating, by using a hash function, a hash of the nonce and a second public key in response to receiving a command to authenticate the second public key from the host, the second public key being generated based on the public key;
producing, by using a verification algorithm, an authentication result based on the hash and the public key; and
writing a second authentication status value for the second public key to a second validity register for the second public key based on the authentication result.

16. A system comprising:
a host; and
a cryptographic device that comprises (i) a host interface to communicate with the host and (ii) a memory structure to store a public key and a validity register that corresponds to the public key, wherein the cryptographic device has exclusive write access to the validity register,
wherein the cryptographic device is configured to (i) perform an authentication of the public key, (ii) write an authentication status value to the validity register based on a result of the authentication, the authentication status value corresponding to one of an authenticated status for the public key or an unauthenticated status for the public key, (iii) receive a command from the host via the host interface, the command indicating a cryptographic operation to be performed by the cryptographic device using the public key, (iv) perform the cryptographic operation based on checking the validity register to determine the authentication status for the public key, and (v) send a failure code to the host in response to the command based on the validity register indicating the unauthenticated status for the public key,
wherein the validity register comprises two or more bits, and the cryptographic device is configured to write the authentication status value to each of the two or more bits, and
wherein the cryptographic device is configured to read the two or more bits from the validity register to determine an authentication status for the public key based on at least one of whether a majority agreement of the two or more bits indicates the authenticated status for the public key or whether any bit of the two or more bits indicates the unauthenticated status for the public key.

17. The system of claim 16, wherein the cryptographic device is configured to grant the host read-only access to the validity register.

18. The system of claim 16, wherein host is configured to load the public key in to the cryptographic device, wherein the cryptographic device is configured to write an unauthenticated status value to the validity register in response to the public key being loaded.

19. The system of claim 16, wherein the memory structure stores a plurality of public keys, and wherein the memory structure comprises validity registers that respectively correspond to the public keys.

20. The system of claim 16, wherein the cryptographic device is configured to:
   generate a nonce in response to receiving a nonce command from the host via the host interface;
   generate, by using a hash function, a hash of the nonce and a second public key in response to receiving a command to authenticate the second public key from the host, the second public key being generated based on the public key;
   produce, by using a verification algorithm, an authentication result based on the hash and the public key; and
   write a second authentication status value for the second public key to a second validity register for the second public key based on the authentication result.

* * * * *